(12) United States Patent
Sabev

(10) Patent No.: US 7,978,850 B2
(45) Date of Patent: Jul. 12, 2011

(54) MANUFACTURING EMBEDDED UNIQUE KEYS USING A BUILT IN RANDOM NUMBER GENERATOR

(75) Inventor: Anton I. Sabev, Santa Clara, CA (US)

(73) Assignee: LSI Corporation, Milpitas, CA (US)

( * ) Notice: Subject to any disclaimer, the term of this patent is extended or adjusted under 35 U.S.C. 154(b) by 1015 days.

(21) Appl. No.: 11/831,038

(22) Filed: Jul. 31, 2007
(Under 37 CFR 1.47)

(65) Prior Publication Data
US 2009/0034732 A1 Feb. 5, 2009

(51) Int. Cl.
| | |
|---|---|
| G06F 1/26 | (2006.01) |
| G06F 11/00 | (2006.01) |
| G06F 9/00 | (2006.01) |
| G06F 9/24 | (2006.01) |
| G06F 15/177 | (2006.01) |
| G08B 13/00 | (2006.01) |
| G08B 21/00 | (2006.01) |
| G08B 29/00 | (2006.01) |
| H04K 1/00 | (2006.01) |
| H04L 9/00 | (2006.01) |
| B41K 3/38 | (2006.01) |

(52) U.S. Cl. .............. 380/46; 726/34; 713/1; 380/2; 380/59

(58) Field of Classification Search .............. None
See application file for complete search history.

(56) References Cited

U.S. PATENT DOCUMENTS

| | | | | |
|---|---|---|---|---|
| 6,961,858 | B2 * | 11/2005 | Fransdonk | 726/29 |
| 7,613,915 | B2 * | 11/2009 | Srinivasan et al. | 713/1 |
| 7,644,278 | B2 * | 1/2010 | Catherman et al. | 713/175 |
| 7,751,568 | B2 * | 7/2010 | Catherman et al. | 380/270 |
| 7,788,483 | B1 * | 8/2010 | Falik et al. | 713/155 |
| 2003/0095665 | A1 * | 5/2003 | Wheeler et al. | 380/282 |
| 2003/0167392 | A1 * | 9/2003 | Fransdonk | 713/156 |
| 2004/0030901 | A1 * | 2/2004 | Wheeler et al. | 713/176 |
| 2005/0144440 | A1 * | 6/2005 | Catherman et al. | 713/156 |
| 2005/0149733 | A1 * | 7/2005 | Catherman et al. | 713/175 |
| 2005/0166051 | A1 * | 7/2005 | Buer | 713/173 |
| 2005/0195975 | A1 * | 9/2005 | Kawakita | 380/30 |
| 2007/0094719 | A1 * | 4/2007 | Scarlata | 726/9 |
| 2008/0069363 | A1 * | 3/2008 | Catherman et al. | 380/282 |
| 2008/0114984 | A1 * | 5/2008 | Srinivasan et al. | 713/175 |

* cited by examiner

Primary Examiner — Nasser Moazzami
Assistant Examiner — Oscar A Louie
(74) Attorney, Agent, or Firm — Christopher P. Maiorana, PC

(57) ABSTRACT

A method of manufacturing a device containing a key is disclosed. The method generally includes the steps of (A) fabricating a chip comprising a random number generator, a nonvolatile memory and a circuit, (B) applying electrical power to the chip to cause the random number generator to generate a signal conveying a sequence of random numbers, (C) commanding the chip to program a first arbitrary value among the random numbers into the nonvolatile memory, wherein the device is configured such that the first arbitrary value as stored in the nonvolatile memory is unreadable from external to the device and (D) packaging the chip.

11 Claims, 8 Drawing Sheets

|  | WE | ED | WRAP |
|---|---|---|---|
| NORMAL-DECRYPT MODE | 0 | 0 | 0 |
| NORMAL-ENCRYPT MODE | 0 | 1 | 0 |
| WRAP-DECRYPT MODE | 1 | 0 | 1 |
| WRAP-ENCRYPT MODE | 1 | 1 | 0 |

MANUFACTURING EMBEDDED UNIQUE KEYS USING A BUILT IN RANDOM NUMBER GENERATOR

CROSS REFERENCE TO RELATED APPLICATIONS

The present application is related to co-pending U.S. patent application Ser. No. 11/830,958, filed Jul. 31, 2007, which is hereby incorporated by reference in its entirety.

FIELD OF THE INVENTION

The present invention relates to digital security generally and, more particularly, to a method for manufacturing embedded unique keys using a built in random number generator.

BACKGROUND OF THE INVENTION

Distribution and control of private cryptography keys create a risk of the keys falling into the possession of the wrong people. The keys may be stolen, improperly copied or accidently duplicated. Once the security of the keys has been compromised, the security of all encrypted ciphertext based on the compromised keys is questionable.

A common solution to control the private keys is to generate and install unique keys into silicon devices used to decrypt the ciphertext. However, a significant amount of manufacturing equipment is commonly used to generate the keys, ascertain that keys are not duplicated and finally install the keys into the devices. The physical security of the communication lines from the manufacturing equipment to the devices still leaves the keys vulnerable to copying. Costs of the manufacturing equipment can be high. Furthermore, operator errors can still result in duplicate keys.

SUMMARY OF THE INVENTION

The present invention concerns a method of manufacturing a device containing a key. The method generally comprises the steps of (A) fabricating a chip comprising a random number generator, a nonvolatile memory and a circuit, (B) applying electrical power to the chip to cause the random number generator to generate a signal conveying a sequence of random numbers, (C) commanding the chip to program a first arbitrary value among the random numbers into the nonvolatile memory, wherein the device is configured such that the first arbitrary value as stored in the nonvolatile memory is unreadable from external to the device and (D) packaging the chip.

The objects, features and advantages of the present invention include providing a method for manufacturing embedded unique keys using a built in random number generator that may (i) reduce a cost of manufacturing the keys within silicon devices, (ii) reduce and/or eliminate a reliance on manufacturing equipment to create, install and/or maintain physical security of the keys, and/or (iii) avoid exposure of the keys at socket pins and/or communication lines of the devices.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally concerns a system and/or method for generating and handling cryptographic keys within a cryptosystem. A technique of the system/method generally creates a cryptographic boundary around a symmetrical cipher operation and makes the one or more keys used by the cipher operation inaccessible to processors and/or other subsystems using the cipher. The technique may achieve some properties of an asymmetric cryptosystem. A user of the system/method may have an ability to encrypt a private key used to create ciphertext, but does not have the ability to decrypt the resulting ciphertext with access to just the encrypted private key.

The present invention may include use of a built in (on-chip) random number generator to generate device unique keys during the manufacturing process. Specialized circuitry within the chip may be used to reroute the random number generator to on-chip nonvolatile memory without exposing the keys external to the chip.

The technique generally provides a low-cost alternative to expensive manufacturing equipment currently used to achieve key injection into devices. Additionally, the system according to the present invention may have a security advantage over existing systems in that exposure of the keys in plaintext form may be avoided at socket pins and/or communication lines of a programming device. The technique may reduce system cost by reducing an internal nonvolatile memory criteria to store cryptographic keys. Furthermore, the invention generally provides a method to generate an unlimited number of keys that may be used by processor in a secure fashion involving an external storage.

Figure 1:
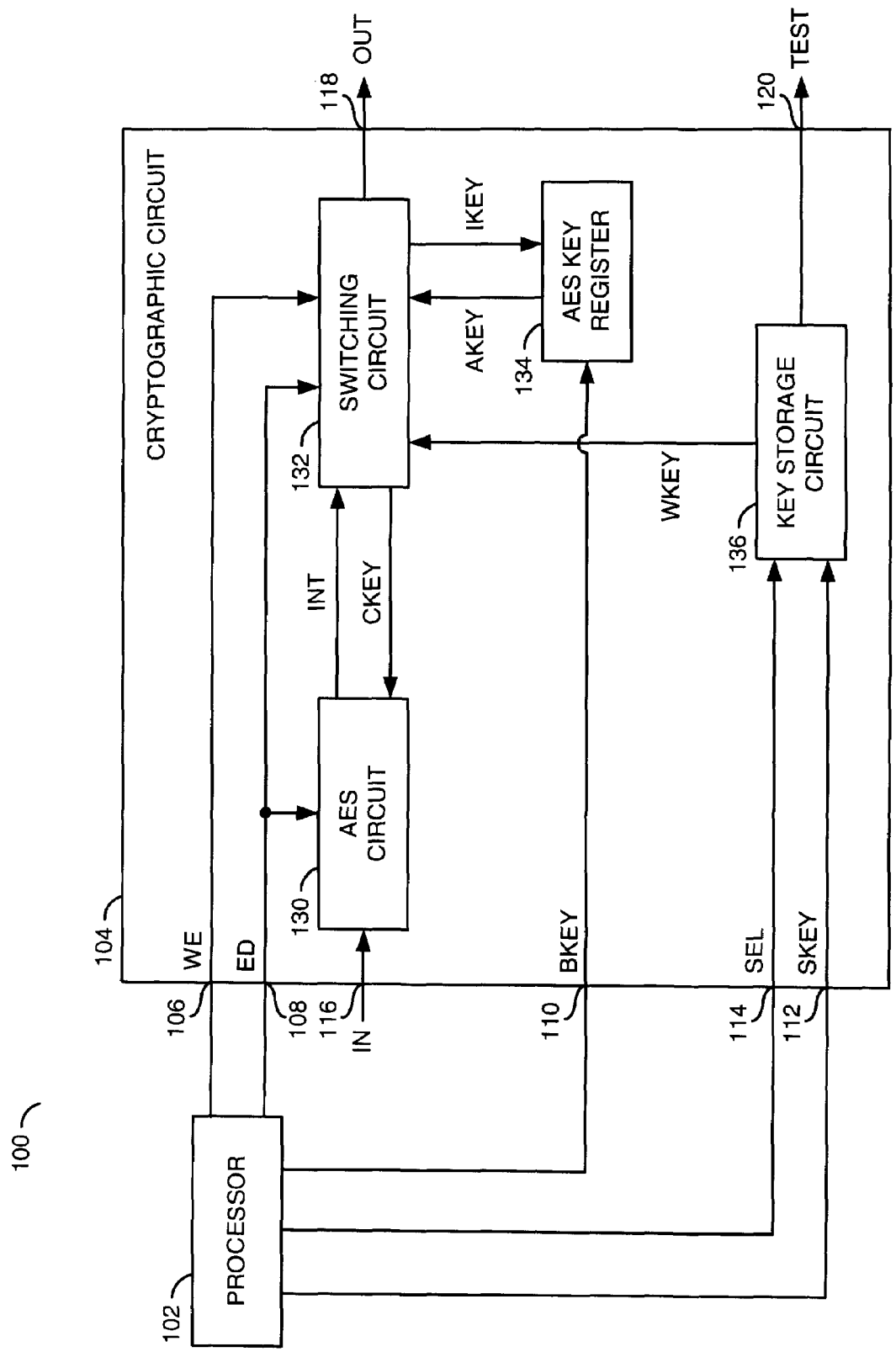
FIG. 1 is a block diagram of system in accordance with a preferred embodiment of the present invention.

Referring to FIG. 1, a block diagram of a system 100 is shown in accordance with a preferred embodiment of the present invention. The system (or apparatus) 100 generally comprises a circuit (or module) 102 and a circuit (or module) 104.

A wrap enable control signal (e.g., WE) may be generated by the circuit 102 and presented to the circuit 104 at an interface 106. A encrypt/decrypt control signal (e.g., ED) may also be generated by the circuit 102 and presented to an interface 108 of the circuit 104. The circuit 102 may write a first cipher key into the circuit 104 via a signal (e.g., BKEY) at an interface 110. A second cipher key may be written by the circuit 102 at an interface 112 of the circuit 104 in a signal (e.g., SKEY). The circuit 102 may also provide an optional select signal (e.g., SEL) to an interface 114 of the circuit 104.

An interface 116 of the circuit 104 may receive data to be encrypted and/or decrypted via an input signal (e.g., IN). An output signal (e.g., OUT) at an interface 118 may carry the resulting ciphertext and/or plaintext. A test signal (e.g., TEST) may be presented from an interface 120 of the circuit 104 to verify the functionality of the circuit 104 while in a test mode.

The circuit 102 may be implemented as one or more processors. The circuit 102 is generally operational to control the modes and/or operations of the circuit 104. The circuit 102 may also generate and load various keys into the circuit 104 for use in the cipher operations.

The circuit 104 may be implemented as a cryptographic circuit. The circuit 104 generally implements a symmetrical cipher operation based on one or more private keys. Ciphertext data may be generated in the signal OUT by encrypting plaintext data received via the signal IN. Plaintext data may be generated in the signal OUT by decrypting ciphertext data received in the signal IN. Mode control to encrypt or decrypt may be determined by the state of the signal ED. The keys may be loaded from the circuit 102 in the signal BKEY and/or the signal SKEY. An encrypted key may also be loaded via the signal IN, decrypted and stored internally. A shared embedded key may be set during fabrication of the circuit 104. An optional device unique key may also be established during the fabrication. Selection among the available keys may be determined by the signal SEL and/or the signal WE.

The circuit 104 generally comprises a circuit (or block) 130, a circuit (or block) 132, a circuit (or block) 134 and a circuit (or block) 136. The signal IN and the signal ED may be received by the circuit 130. The signal WE and the signal ED may be received by the circuit 132. The circuit 132 may generate and present the signal OUT. The circuit 134 may receive the signal BKEY. The circuit 136 may receive the signal SKEY and the signal SEL. The signal TEST may be generated and presented by the circuit 136.

An intermediate signal (e.g., INT) may be generated by the circuit 130 and presented to the circuit 132. The circuit 132 may generate a cipher key in a signal (e.g., CKEY) that is transferred to the circuit 130. An intermediate key signal (e.g., IKEY) may be transferred from the circuit 132 to the circuit 134. The circuit 134 may return a key signal (e.g., AKEY) to the circuit 132. The circuit 136 may provide a wrap key signal (e.g., WKEY) to the circuit 132.

The circuit 130 may be configured as a symmetric encryption/decryption circuit. In some embodiments, the cipher may operate according to the Advanced Encryption Standard (AES), National Institute of Standards and Technology (NIST), U.S. Federal Information Processing Standard (FIPS) PUB 197 (FIPS 197). Other encryption/decryption methods may be implemented to meet the criteria of a particular application.

Selection between encryption and decryption may be controlled by the signal ED. While the signal ED is in an encrypt state (e.g., a logical one state), the circuit 130 may encrypt the data received in the signal IN and present the resulting ciphertext in the signal INT. While the signal ED is in a decrypt state (e.g., a logical zero state), the circuit 130 may decrypt the ciphertext received via the signal IN and present the decrypted data in the signal INT. Both the encryption and the decryption may be performed using a cipher key received in the signal CKEY.

The circuit 132 may be implemented as a switching circuit. The circuit 132 may be operational to transfer (or route) data from the signal INT to either the signal OUT or the signal IKEY based on the states of the signal WE and the signal ED. The circuit 132 may also be operational to transfer (or route) data to the signal CKEY from either the signal AKEY or the signal WKEY based on the signals WE and the signal ED.

The circuit 134 may implement a key register. The circuit 134 is generally operational to buffer an AES key used by the circuit 130. The circuit 134 may receive the AES key from the circuit 132 via the signal IKEY and/or from the circuit 102 via the signal BKEY. A design of the circuit 104 may be arranged such that the contents of the circuit 134 (e.g., the AES key) is not electronically readable from external to the circuit 104.

The circuit 136 may be operational to store one or more keys. The circuit 136 may include an optional capability to generate and store a device unique key internally. A selected stored key may be presented by the circuit 136 in the signal WKEY based on the signal SEL and the signal SKEY. While in a test mode, the circuit 136 may present a test key to the interface 120 via the signal TEST.

Figure 2:
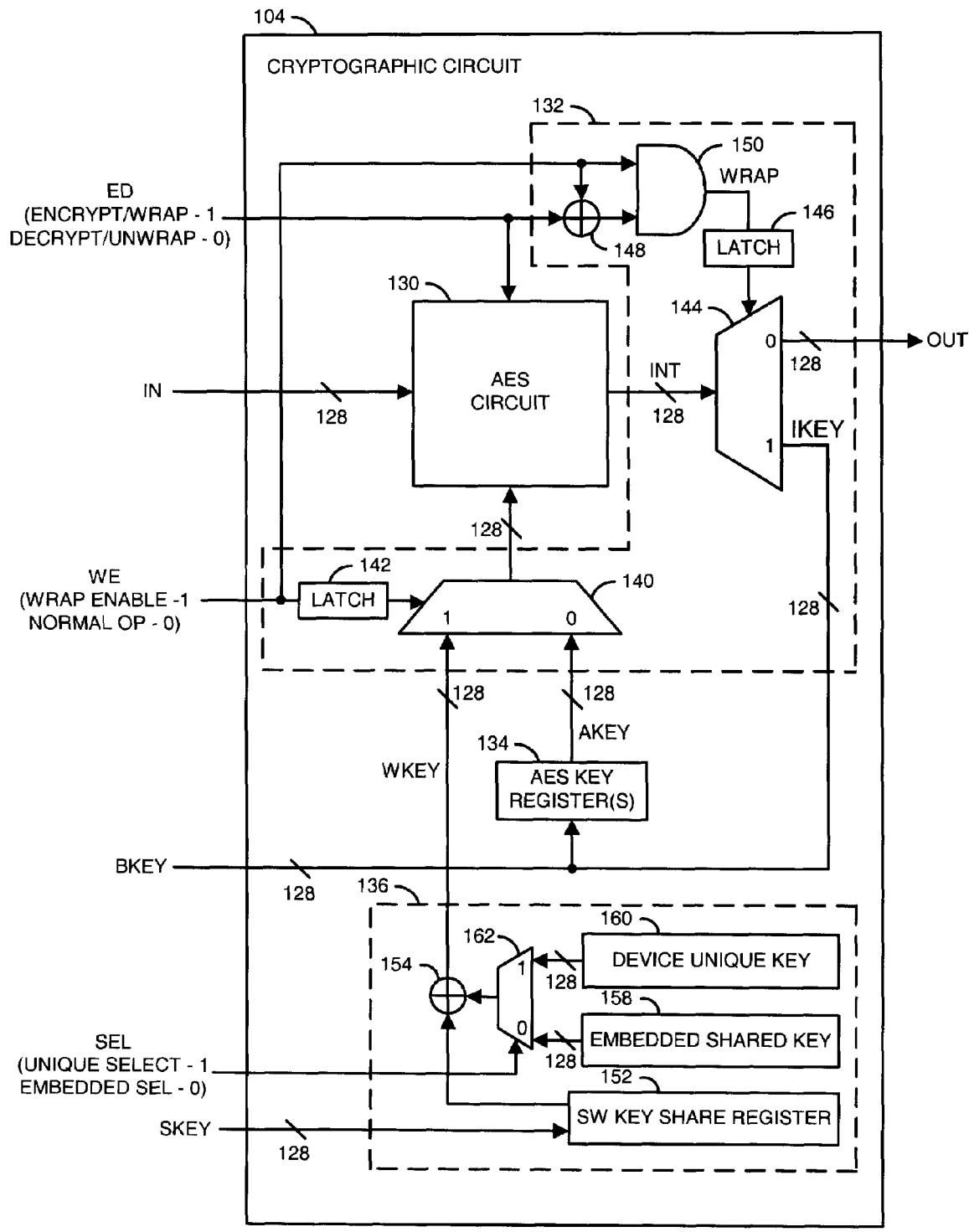
FIG. 2 is a detailed block diagram of an example implementation of a cryptographic circuit.

Referring to FIG. 2, a detailed block diagram of an example implementation of the circuit 104 is shown. The circuit 104 generally comprises the circuit 130, the circuit 134, a circuit (or block) 140, a circuit (or block) 142, a circuit (or block) 144, a circuit (or block) 146, a circuit (or block) 148, a circuit (or block) 150, a circuit (or block) 152, a circuit (or block) 154, a circuit (or block) 158, a circuit (or block) 160 and a circuit (or block) 162.

The circuit 140 may (i) present the signal CKEY and (ii) receive both of the signals WKEY and AKEY. The circuit 142 may latch the signal WE. The circuit 144 may (i) receive the signal INT and (ii) present both of the signals OUT and IKEY. The circuit 146 may latch a signal (e.g., WRAP). The circuit 148 may perform a logical exclusive OR on the signals WE and ED. The circuit 150 may generate the signal WRAP by logically AND'ing the signal WE and the result generated by the circuit 148. The circuit 152 may receive a software key via the signal SKEY. The circuit 154 may generate the signal WKEY by performing a logical exclusive OR on the contents of the circuit 152 and one of the circuits 158 or 160. The circuit 162 may feed the contents of the circuits 158 and 160 to the circuit 154 based on the signal SEL.

Figures 3, 9:
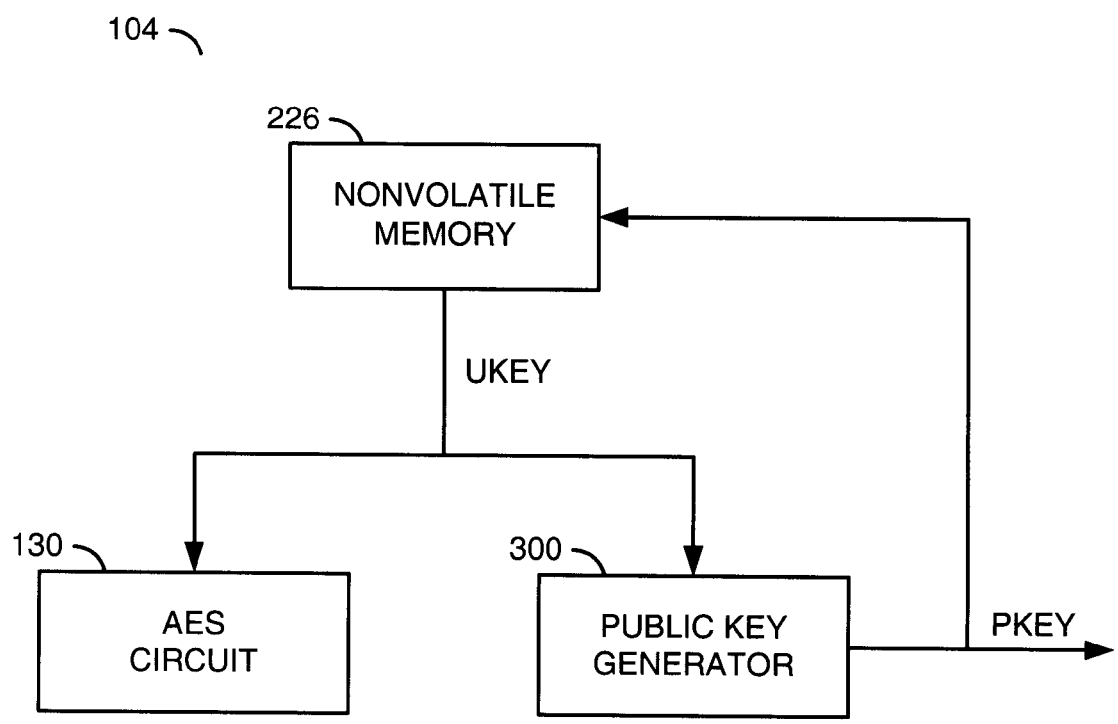
FIG. 3 is a table of modes for the cryptographic circuit.
FIG. 9 is a partial block diagram of another example implementation of the cryptographic circuit.

The circuit 140 may implement a multiplexer. The circuit 140 is generally operational to multiplex the signals WKEY and AKEY to create the signal CKEY based on the signal WE. Referring to FIG. 3, a table of modes for the circuit 104 is shown as a function of the signal WE and the signal ED. While the signal WE is in a non-wrap state (e.g., the logical zero state), the circuit 104 may operation in either a normal-decrypt mode or a normal-encrypt mode. While the signal WE is in a wrap state (e.g., the logical one state), the circuit 104 may operate in either a wrap-decrypt mode of a wrap-encrypt mode. Decryption may occur while the signal ED is in the decryption state. Encryption may occur while the signal ED is in the encryption state. In both the normal-decrypt mode and the normal-encrypt mode, the data in the signal CKEY may match the data in the signal AKEY. In both the wrap-decrypt mode and the wrap-encrypt mode, the data in the signal CKEY may match the data in the signal WKEY.

Referring again to FIG. 2, the circuit 142 may implement a latch. The circuit 142 may be clocked so that a transition of the circuit 140 may occur just before or at a start of a cipher operation by the circuit 130.

The circuit 144 may implement a demultiplexer. The circuit 144 is generally operational to demultiplex the signal INT to the signal OUT or the signal IKEY based on the signal WRAP (see FIG. 3). While the signal WRAP is in an internal state (e.g., the logical one state), the data in the signal INT may be transferred to the signal IKEY. While the signal WRAP is in an external state (e.g., the logical zero state), the data in the signal INT may be transferred to the signal OUT.

The circuit 146 may implement a latch. The circuit 146 may be clocked so that a transition of the circuit 144 may occur just before or at a start of a cipher operation by the circuit 130.

The circuit 148 may implement a logical exclusive OR gate. The circuit 150 may implement a logical AND gate. The circuits 148 and 150 may be configured to generate the signal WRAP according to the table shown in FIG. 3.

The circuit 152 generally implements as a programmable register. The circuit 152 may be programmed via the signal SKEY from software executing in the circuit 102. The programmable (software) key may be available to the circuit 154. In some embodiments, the circuit 152 may be implemented as a volatile memory (or buffer). In other embodiments, the circuit 152 may be implemented as an erasable nonvolatile memory.

The circuit 154 may implement a multi-bit logical exclusive OR gate. The circuit 154 may selectively exclusively OR the programmable key from the circuit 152 with either an embedded shared key in the circuit 158 or a device unique key stored in the circuit 160. Selection between the embedded shared key and the device unique key may be performed by the circuit 162. The circuit 162 may be configured as a multiplexer that is controlled by the signal SEL. While the signal SEL is in a unique state (e.g., the logical one state), the circuit 162 may transfer the device unique key. While the signal SEL is in a shared state (e.g., the logical zero state), the circuit 162 may transfer the embedded shared key.

The circuit 158 may implement an embedded shared key register. The circuit 158 may be programmed with a permanent key value set either during or after fabrication. Multiple chips implementing the circuit 104 may each have a same key value in the respective circuits 158. The circuit 158 may be mask programmed, laser programmed, fuse programmed, anti-fuse programmed or the like.

The circuit 160 may implement a device unique key register. The circuit 160 is generally a one-time programmable register. Programming of the device unique key may be a random number, a pseudo-random number, a partially random number or the like. Multiple chips implementing the circuit 104 may each have a unique key value in the respective circuits 160. Each of the keys stored in the circuits 152, 158 and 160 may be multi-bit (e.g., 128 bit) keys. Other key sizes may be implemented to meet the criteria of a particular application and cipher operation.

Figure 4:
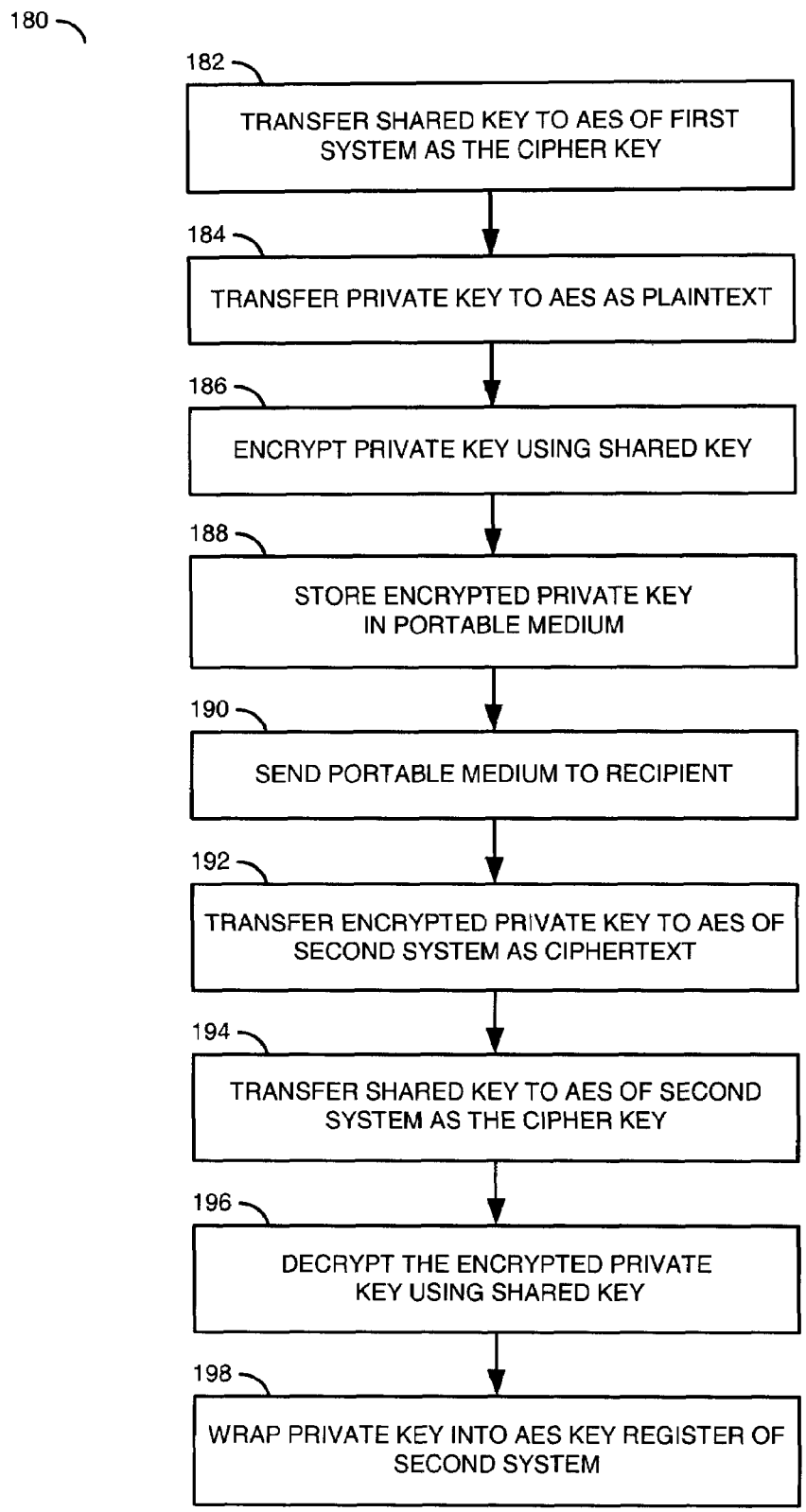
FIG. 4 is a flow diagram of an example method of an asymmetric key wrap.

Referring to FIG. 4, a flow diagram of an example method 180 of an asymmetric key wrap is shown. The method (or process) 180 may be implemented by two or more copies of the system 100. The method 180 generally comprises a step (or block) 182, a step (or block) 184, a step (or block) 186, a step (or block) 188, a step (or block) 190, a step (or block) 192, a step (or block) 194, a step (or block) 196 and a step (or block) 198.

In the step 182, the embedded shared key in an originating system may be transferred from the circuit 158 to the circuit 130 for use as the cipher key. In the step 184, a private key may be transferred in plaintext form to the circuit 130 via the signal IN. The circuit 130 may encrypt the private key using the cipher (embedded shared) key in the step 186. The resulting encrypted private key may be transferred from the system to a portable storage medium via the signal OUT in the step 188. The portable storage medium may then be sent to one or more intended recipient systems in the step 190.

Upon receipt of the portable storage medium at any given one of the one or more recipient systems, the encrypted private key may be transferred via the signal IN to the circuit 130 in the step 192. The embedded shared key in the circuit 158 of the recipient system may be transferred from the circuit 158 to the circuit 130 in the step 194. In the step 196, the circuit 130 of the recipient system may decrypt the encrypted private key using the embedded shared key. The decrypted private key may be wrapped by the circuit 132 from the circuit 130 to the circuit 134 for storage in the step 198. As such, the private key entered into the originating system (in the signal IN) may ultimately reside in the circuit 134 of the recipient systems without being exposed to copying in plaintext form.

Figure 5:
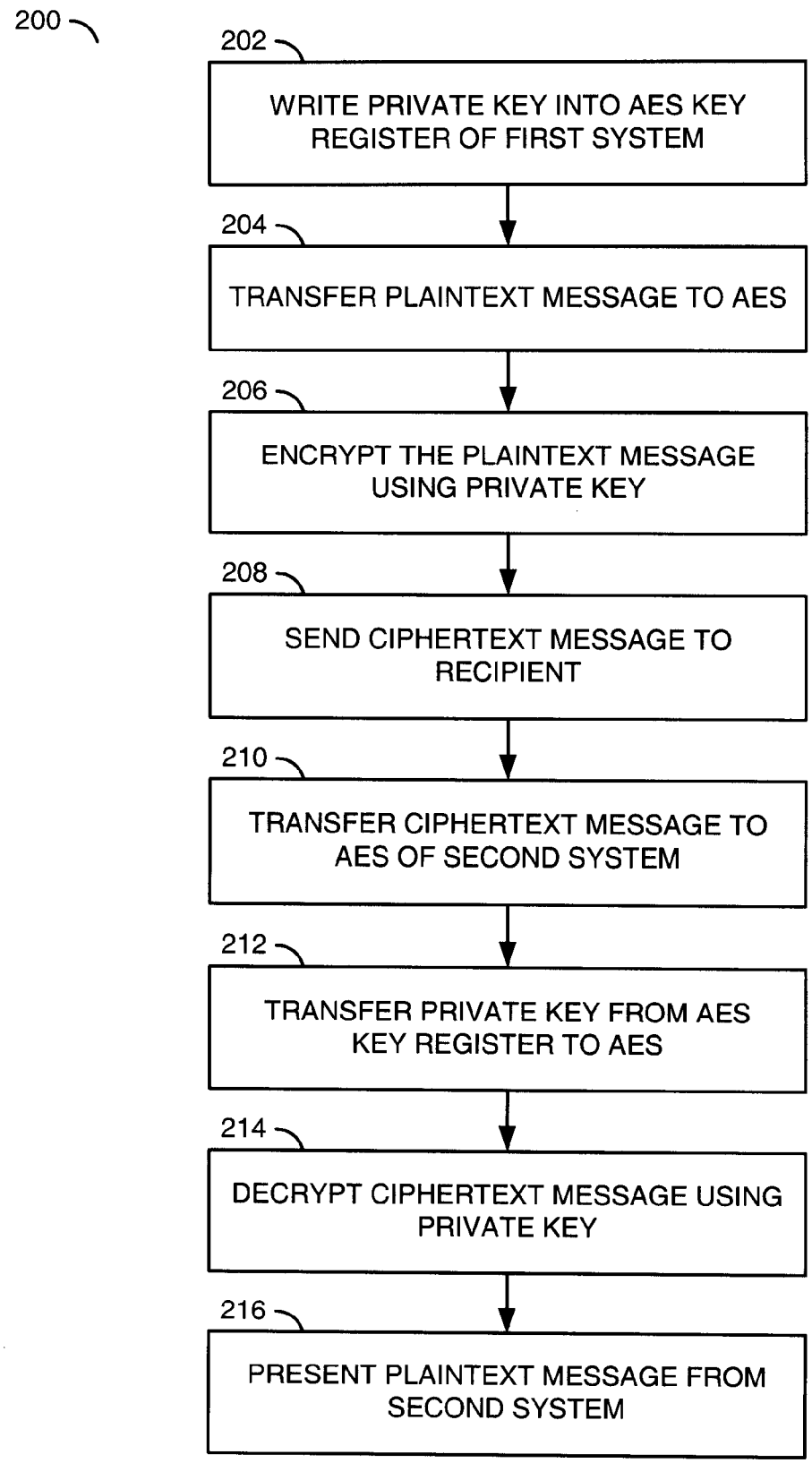
FIG. 5 is a flow diagram of an example method of transmitting ciphertext messages using a private key from FIG. 4.

Referring to FIG. 5, a flow diagram of an example method 200 of transmitting ciphertext messages using the private key from FIG. 4 is shown. The method (or process) 200 may be implemented by the one or more systems 100 described in connection with the asymmetric key wrap method 180. The method 200 generally comprises a step (or block) 202, a step (or block) 204, a step (or block) 206, a step (or block) 208, a step (or block) 210, a step (or block) 212, a step (or block) 214 and a step (or block) 216.

In the step 202, the private key may be written into the circuit 134 of the originating system by the circuit 102 in the signal BKEY. A plaintext message may be transferred via the signal IN to the circuit 130 of the originating system in the step 204. In the step 206, a ciphertext message may be generated by the circuit 130 by encrypting the plaintext message with the private key buffered in the circuit 134. The ciphertext message may be transmitted from the originating system to the one or more recipient systems in the step 208.

At any one or more of the recipient systems, the received ciphertext message may be transferred to the circuit 130 in the step 210. The private key previously written into the circuit 134 of the recipient system (see FIG. 4) may be transferred to the circuit 130 as the cipher key in the step 212. In the step 214, the circuit 130 of the recipient system may recreate the original plaintext message by decrypting the ciphertext message using the private key. The reproduced plaintext message may then be presented from the recipient system in the signal OUT in the step 216.

Figure 6:
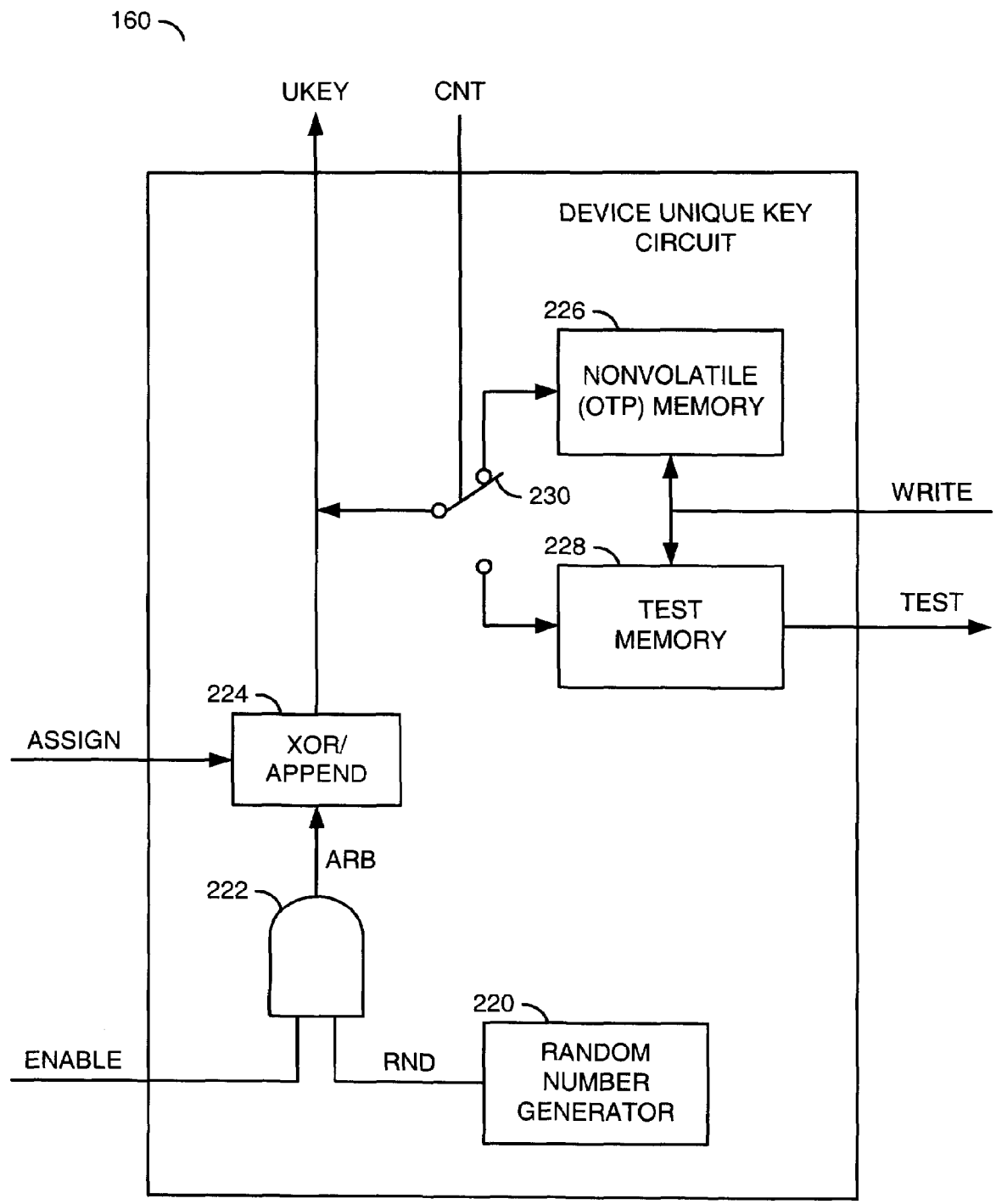
FIG. 6 is a detailed diagram of an example implementation of a device unique key circuit.

Referring to FIG. 6, a detailed diagram of an example implementation of the circuit 160 is shown. The circuit (or device) 160 is generally operational to generate a unique key (or identification number) during a manufacturing process without using specialized equipment. The device 160 generally comprises a circuit (or module) 222, an optional circuit (or module) 224, a circuit (or module) 226, a circuit (or module) 228, an optional circuit (or module) 230 and an optional circuit (or module) 232.

A signal (e.g., RND) may be generated by the circuit 220 and presented to the circuit 222. A signal (e.g., ENABLE) may be received by the circuit 222. The circuit 222 may generate a signal (e.g., ARB) by logically AND'ing the signal ENABLE and the signal RND. The signal ARB and a signal (e.g., ASSIGN) may be presented to the circuit 224. The circuit 224 may generate a signal (e.g., UKEY) based on the signal ARB and the signal ASSIGN. The signal UKEY may also be transferred (i) to and from the circuit 226 and (ii) to and from the circuit 228 via the circuit 230. A signal (e.g., WRITE) may be received by both the circuit 226 and the circuit 228. The circuit 228 may present the signal TEST. A signal (e.g., CNT) may be received by the circuit 230.

The circuit 220 may implement a random number generator. The circuit 220 is generally operational to create a sequence of random number values in the signal RND. In some embodiments, the sequence of values in the signal RND may be a pseudo-random sequence.

The circuit 222 may be implemented as a set of logical AND gates. One logical AND gate may exist for each bit of the signal RND (e.g., 128 gates for 128 bits). While the signal ENABLE is in an inactive state (e.g., the logical zero state), the circuit 222 may generate a value of zero in the signal ARB. While the signal ENABLE is in an active state (e.g., the logical one state), the circuit 222 may transfer the values in the signal RND into the signal ARB.

The circuit 224 may be implemented as one or more modification circuits. The circuit 224 may operate as, but is not limited to, a logical exclusive OR modification function and/or an append modification function. As an exclusive OR function, the circuit 224 may generate the signal UKEY by logically exclusively OR'ing the signal ARB with the signal ASSIGN. As such, each bit of the signal ASSIGN may be used to transfer a respective bit of the signal ARB to the signal UKEY either inverted or non-inverted, depending on the state of the corresponding bit in the signal ASSIGN. As an appending function, the bits of the signal ASSIGN may be appended to the bits of the signal ARB to create the signal UKEY. For example, a 28-bit signal ASSIGN may be appended to a 100-bit signal ARB to create a 128-bit signal UKEY. The bits of the signal ASSIGN may be presented to the circuit 160 during manufacturing to ensure that no two copies of the circuit 160 have the same value for the key in the signal UKEY.

The circuit 226 may be implemented as a nonvolatile memory. The circuit 226 may be operational to store the signal UKEY in response to the signal WRITE. Assertion of the signal WRITE may cause a single arbitrary value currently present in the signal UKEY to be stored in the circuit 226. The circuit 104 is generally designed such that the key value stored in the circuit 226 is not electronically readable from outside (external) to the circuit 104. The key value stored in the circuit 226 may be exclusively available to the circuit 130 through the circuits 162, 154 and 140. In some embodiments, the circuit 226 may be implemented as an electronically one-time-programmable memory. For example, the circuit 226 may be fuse programmable or anti-fuse programmable. Other one-time-programmable technologies may be implemented to meet the criteria of a particular application.

The circuit 228 may implement as a test memory. The circuit 228 may be either a volatile memory or a nonvolatile memory. The circuit 228 may be operational to store one or more key values as received from the circuit 224 via the signal UKEY. Writing to the circuit 228 may be controlled by the signal WRITE. The key values stored in the circuit 228 may be presented to the circuit 130 as the cipher key and may be presented external to the circuit 104 via the signal TEST. The ability to read the key value stored in the circuit 228 generally allows the manufacturer of the circuit 104 to test that the circuit 220 is in fact generating a random sequence of values in the signal RND.

The circuit 230 may implement an electronic switch that is controlled by the signal CNT. While the signal CNT is in a normal state (e.g., the logical one state), the circuit 230 may transfer the device unique key value into and out of the circuit 226 in the signal UKEY. While the signal CNT is in a test state (e.g., the logical zero state), the circuit 230 may (i) isolate the circuit 226 and (ii) transfer a test key value into and out of the circuit 228 in the signal UKEY.

Figure 7:
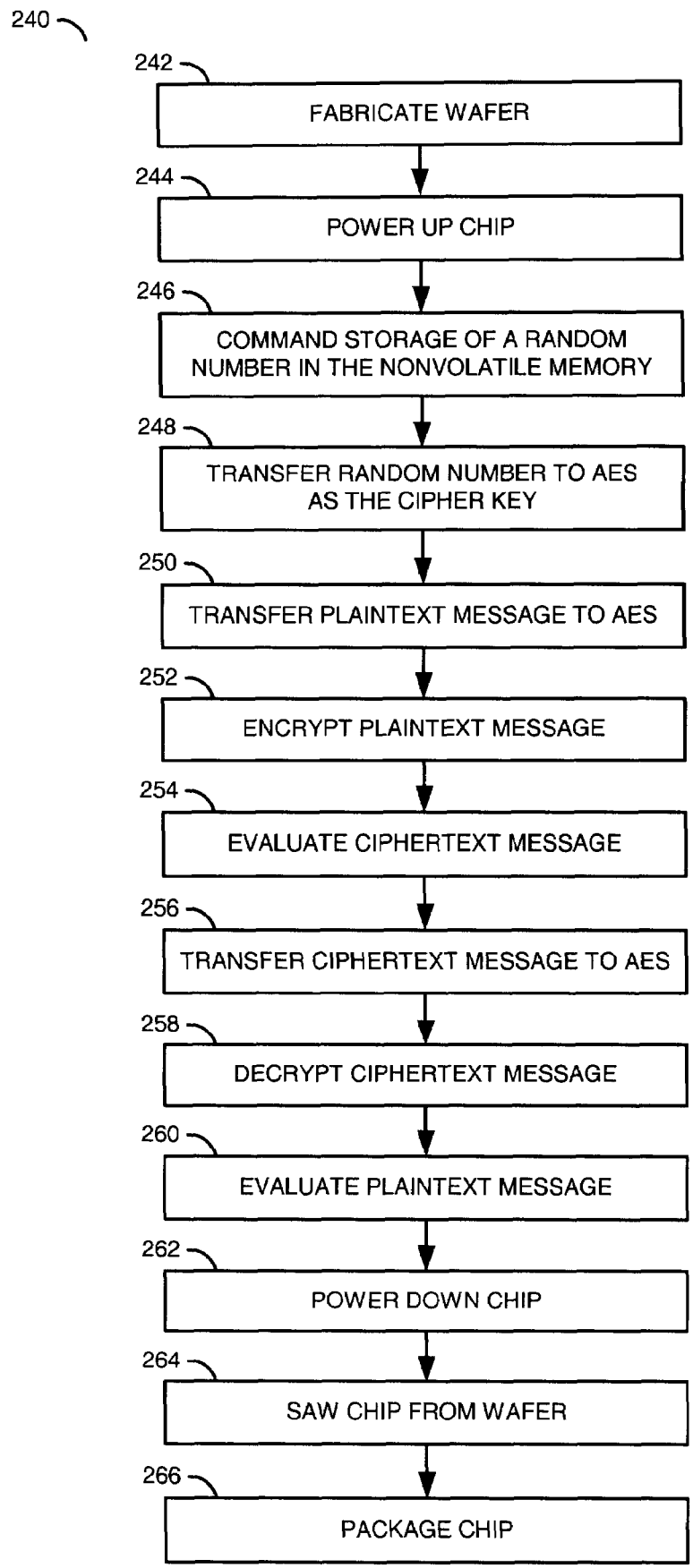
FIG. 7 is a flow diagram of an example method to program a device unique key.

Referring to FIG. 7, a flow diagram of an example method 240 to program a device unique key is shown. The method (or process) 240 may be implemented by the device 160. The method 240 generally comprises a step (or block) 242, a step (or block) 244, a step (or block) 246, a step (or block) 248, a step (or block) 250, a step (or block) 252, a step (or block) 254, a step (or block) 256, a step (or block) 258, a step (or block) 260, a step (or block) 262, a step (or block) 264 and a step (or block) 266.

In the step 262, the device 160 may be fabricated on (in) a chip that may be part of a wafer containing multiple copies of the device 160. After bonding pads and/or test pads have been created, a chip having the device 160 may be powered up in the step 244. The application of electrical power generally causes the circuit 220 to begin generating the sequence of random numbers in the signal RND.

In the step 246, the signal ENABLE may be asserted, the signal ASSIGN may be set, the signal CNT may be set to the normal state and the signal WRITE may be activated to command a single key value among the sequence of random values to be written into the circuit 226 as the device unique key value. The device unique key may then be transferred from the circuit 226 to the circuit 130 for use as the cipher key in the step 248.

To test for encryption functionality, a plaintext test message may be presented to the circuit 130 in the step 250. The circuit 130 generally encrypts the plaintext test message using the device unique key in the step 252. The resulting ciphertext test message may then be read in the signal OUT and evaluated for encryption in the step 254.

To test for decryption functionality, the ciphertext test message may be returned to the circuit 130 in the step 256 through the signal IN. In the step 258, the circuit 130 may decrypt the ciphertext test message using the device unique key. The reconstructed plaintext test message may then be read via the signal OUT and evaluated for proper decryption in the step 260.

In the step 262, the chip under test may be powered down. The wafer may be sawed in the step 264 to separate the individual chips. Finally, the chips that passed the encrypting/decrypting testing may be packaged in the step 266.

Figure 8:
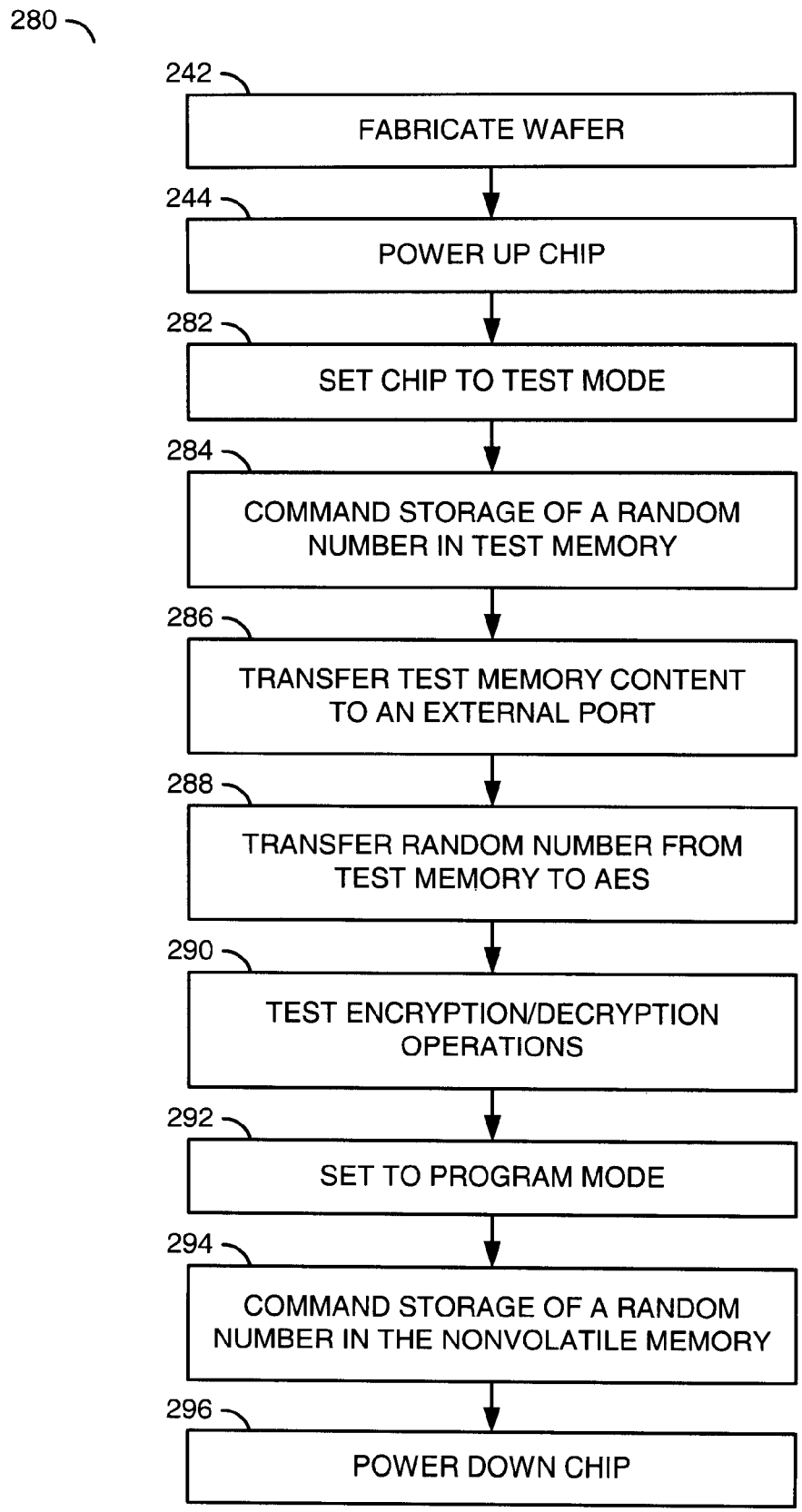
FIG. 8 is a flow diagram of an example method to test a random number generation.

Referring to FIG. 8, a flow diagram of an example method 280 to test the random number generation is shown. The method (or process) 280 may be implemented by the device 160. The method 280 generally comprises the step 242, the step 240, a step (or block) 282, a step (or block) 284, a step (or block) 286, a step (or block) 288, a step (or block) 290, a step (or block) 292, a step (or block) 294 and a step (or block) 296.

In the step 242, the chip may be fabricated as part of the wafer. A particular chip under test may be powered up in the step 242 to start the circuit 220. The signal CNT may be set to the test state in the step 282. The signal ENABLE may be activated, the signal ASSIGN may be set and the signal WRITE may be asserted in the step 284 to command a signal arbitrary value among the random number values of the signal UKEY to be written into the memory 228 as a test key value. The test key may be transferred from the memory 228 to the interface (external port) 120 in the step 286 so that the test key value is known to the test operators.

In the step 288, the test key may be transferred from the memory 228 to the circuit 130 as the cipher key. The test operators may then test an encryption functionality and/or a decryption functionality of the circuit 130 in the step 290 since the cipher (test) key is known.

If the testing is successful, the chip may be commanded to a programming mode in the step 292 by setting the signal CNT to the normal state. Thereafter, the signal WRITE may be asserted again in the step 294 causing another arbitrary random value from the signal UKEY to be permanently stored in the circuit 226. The chip just programmed may be powered down in the step 296.

Referring to FIG. 9, a partial block diagram of another example implementation of the circuit (or device) 104 is shown. The device 104 may optionally include a circuit (or module) 280. The circuit 300 may receive the signal UKEY from the circuit 226. The circuit 300 may generate and present a signal (e.g., PKEY) at an external port of the device 104. The signal PKEY may also be presented back to the circuit 226.

The circuit 300 may implement a public key generator. The circuit 300 is generally operational to generate a public key value in the signal PKEY based on a private key value received in the signal UKEY. The public key may be stored in the circuit 226 for later retrieval. Once the public key is read from the device 104 and made widely available, multiple sources may prepare ciphertext messages with the public key suitable for deciphering by the circuit 130 using the private key stored in the circuit 226.

The functions performed by the diagrams of FIGS. 1-9 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

While the invention has been particularly shown and described with reference to the preferred embodiments thereof, it will be understood by those skilled in the art that various changes in form and details may be made without departing from the scope of the invention.

The invention claimed is:

1. A method of manufacturing a device containing a key, comprising the steps of:
   (A) fabricating a chip comprising a random number generator, a nonvolatile memory and a circuit;
   (B) applying electrical power to said chip to cause said random number generator to generate a signal conveying a sequence of random numbers;
   (C) commanding said chip to program a first arbitrary value among said random numbers into said nonvolatile memory, wherein said device is configured such that said first arbitrary value as stored in said nonvolatile memory is unreadable from external to said device;
   (D) commanding said device to program a second arbitrary value among said random numbers into a test memory of said device;
   (E) transferring said second arbitrary value from said test memory to an external port of said chip;
   (F) testing an operation in said circuit that utilizes said second arbitrary value, said testing occurring prior to commanding said chip to program said first arbitrary value into said nonvolatile memory; and
   (G) packaging said chip.

2. The method according to claim 1, further comprising the step of:
   testing an operation of said circuit that utilizes said first arbitrary value.

3. The method according to claim 2, wherein said operation comprises an encryption operation and said first arbitrary value comprises an encryption key.

4. The method according to claim 1, wherein said operation comprises an encryption operation and said second arbitrary value comprises an encryption key.

5. The method according to claim 1, wherein said operation comprises a decryption operation and said second arbitrary value comprises a decryption key.

6. The method according to claim 1, further comprising the step of:
   applying an assignment number to an external port of said chip.

7. The method according to claim 6, further comprising the step of:
   modifying said first arbitrary value inside said chip by appending said assignment number to said signal generated by said random number generator.

8. The method according to claim 1, further comprising the step of:
   generating a public key inside said chip based on said first arbitrary value, wherein said first arbitrary value comprises a private key.

9. The method according to claim 8, further comprising the step of:
   storing said public key in said nonvolatile memory.

10. The method according to claim 9, further comprising the step of:
    transferring said public key from said nonvolatile memory to an external port of said device.

11. The method according to claim 1, wherein said nonvolatile memory comprises a one-time programmable memory.

* * * * *